United States Patent [19]

Soulos

[11] 3,835,577
[45] Sept. 17, 1974

[54] ELECTRICAL DISCHARGE INSECT CONTROL SYSTEM

[75] Inventor: George D. Soulos, Chelmsford, Mass.

[73] Assignee: Gem Insect Control, Inc., Lowell, Mass.

[22] Filed: Apr. 26, 1972

[21] Appl. No.: 247,858

[52] U.S. Cl. .................................................. 43/112
[51] Int. Cl. ............................................ A01m 1/22
[58] Field of Search ....................................... 43/112

[56] References Cited
UNITED STATES PATENTS

| | | | |
|---|---|---|---|
| 1,962,439 | 6/1934 | Folmer et al. | 43/112 |
| 2,092,136 | 9/1937 | Plym et al. | 43/112 |
| 2,106,528 | 1/1938 | Jones et al. | 43/112 |
| 2,941,328 | 6/1960 | Streat | 43/112 |
| 3,177,609 | 4/1965 | De Marco | 43/112 |

Primary Examiner—Louis G. Mancene
Assistant Examiner—J. N. Eskovitz
Attorney, Agent, or Firm—Weingarten, Maxham & Schurgin

[57] ABSTRACT

An electrical discharge, insect control system operative to attract insects to a space between inner and outer electrified screens where insect electrocution is accomplished. System elements are positioned by attachment to a rigid, central support column, vertically traversing the entire structure so as to provide a strong support which reinforces the unit against physical damage. The inner and outer wire meshes are spaced by a plurality of extended length, slippery insulators which prevent impairment of the electric field between screens from an accumulation of insects on the insulators. The outer screen is collared with rigid end bands which maintain screen shape and prevent abrasion from contact with screen edges. A simplified, yet rigid attachment system permits easy replacement of the screens and insulators as a unit when necessitated by damage.

12 Claims, 3 Drawing Figures

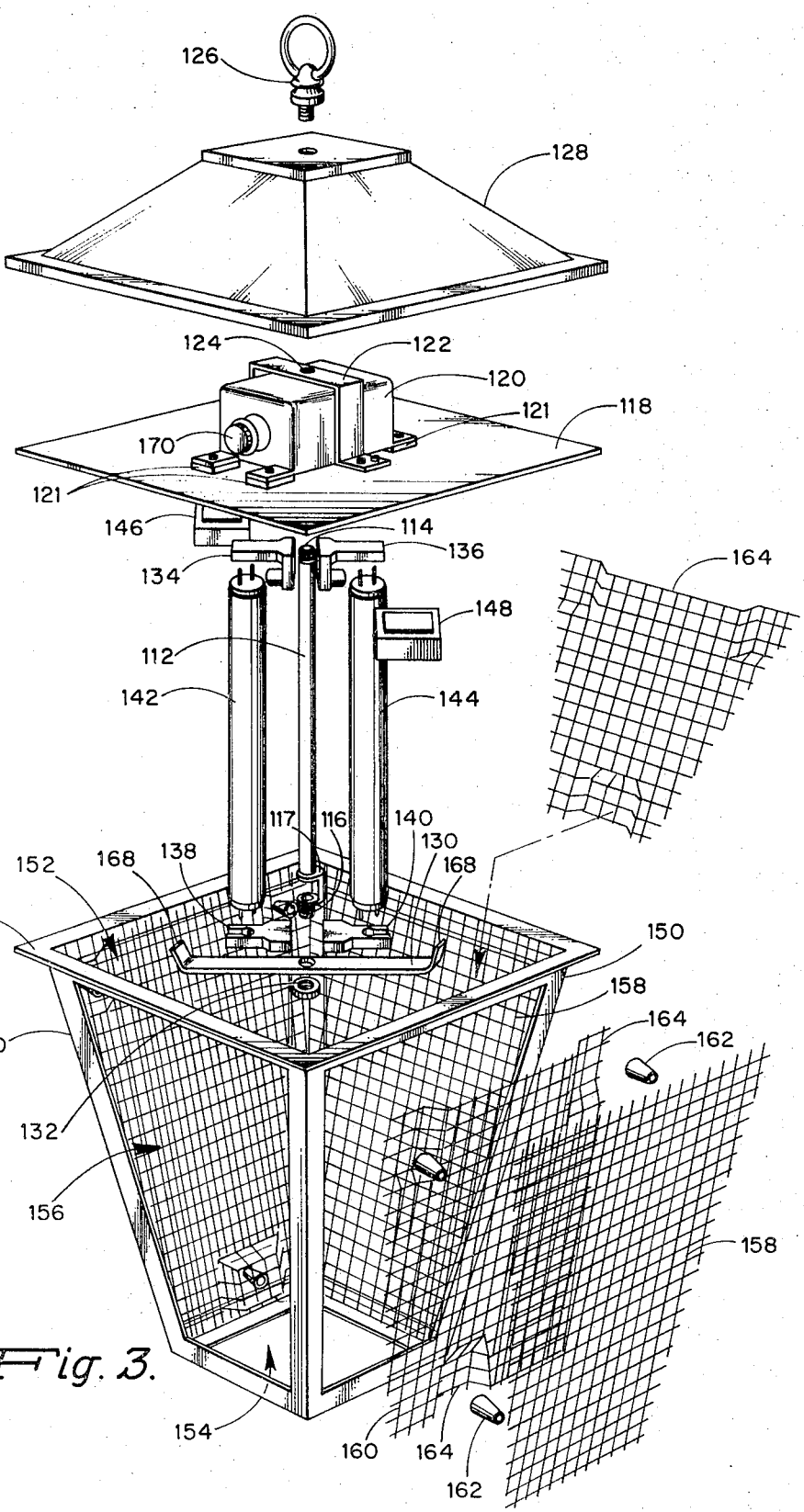

ELECTRICAL DISCHARGE INSECT CONTROL SYSTEM

FIELD OF THE INVENTION

This invention relates to electrical discharge, insect control systems.

BACKGROUND OF THE INVENTION

Electrical insect extermination is a well known art and many designs are commonly available today which cause the electrocution of unwanted flying insects by luring the insects with ultraviolet lamps to a space between electrically energized screens where they are destroyed by an electrical discharge. Several representative designs are shown in United States patents of De Marco, U.S. Pat. No. 3,177,609; Streat, U.S. Pat. No. 2,941,328; Partridge, U.S. Pat. No. 2,835,071; and Peek, U.S. Pat. No. 3,321,862.

With the concern today over the ecological poisoning produced by chemical insecticides, the electrical discharge insect control approach is becoming an increasing attractive method for eliminating bothersome insects from selected areas such as home terraces or gardens. Electrical insect control devices depend for their effectiveness not only upon a continuing ability to attract insects away from people but also upon the cummulative depopulation of insects in the selected area of use. Only if the insect control device is employed for extended periods during each day is it possible to achieve this overall reduction in the insect population. This requires that the device be installed permanently, and because of its high voltage dangers, preferably placed out of human reach. The practical electrical discharge insect control system must then be of sturdy and rugged design to withstand continuous weathering by the elements as well as battering from winds and airborn debris. It must be designed to operate over extended periods without frequent maintenance. Also, when maintenance is required it is desirable to have the more readily damaged components designed for simple and easy replacement.

BREIF SUMMARY OF THE INVENTION

These and other features for an insect control system are provided according to a preferred embodiment of the present invention having enhanced structural rigidity, freedom from decreasing efficiency due to accumulations of dead insects and rapid replaceability of more readily damaged components.

In the design of the present unit, inner and outer electrically energized wire screens enclose an ultraviolet insect lure. To add rigidity to the wire screens, to reinforce them against physical deformation and to shield sharp edges of the screens, first and second collars are provided at respective ends of the outer screen. Further rigidity is provided through the use of a central support column extending the vertical height of the device and providing support and positioning for the device components. The upper collar is attached for ease of replacement to a support plate secured to the central support column and the bottom support collar is similarly secured to the bottom of the support column to secure coaxial positioning of column and screens. The inner wire screen is supported from the outer screen by a plurality of insulators, to provide a screen assembly easily replaced as a unit. The insulators are preferably slippery and dimensioned substantially longer than the spacing between the screens to inhibit an accumulation of insects on the insulators as would resistively shunt the screens and lower the potential difference between them and reduce the insect control efficiency.

BRIEF DESCRIPTION OF THE DRAWINGS

These and other features of the present invention are more fully described below in a detailed description of a preferred embodiment presented for purposes of illustration, and not by way of limitation, and in the accompanying drawings of which:

FIG. 2 is a sectional and pictorial view of an insulated screen spacer employed in the unit of FIG. 1; and FIG. 3 is an exploded view of a modified design according to the invention.

DETAILED DESCRIPTION OF THE PREFERRED EMBODIMENT

Figure 1:
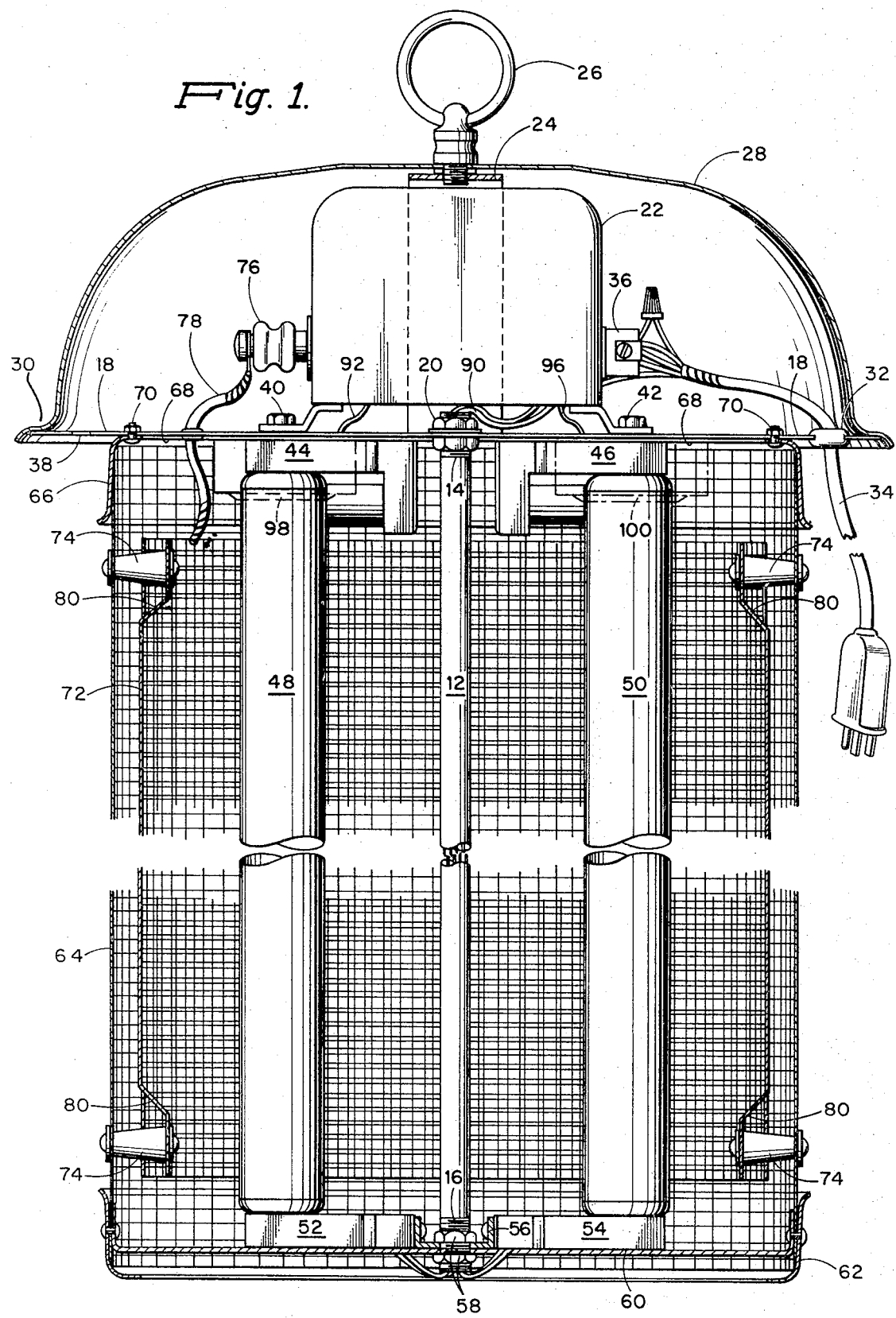
FIG. 1 is a cut away pictorial view of an electrical discharge insect control system according to the invention.

By reference now to FIG. 1 the details of construction of the unit are clearly observed. A strong central support conduit 12 is threaded at its opposing ends 14 and 16 forming respective top and bottom portions. A circular support plate 18 is attached by a bolt 20 to upper threads 14 to support a high voltage transformer 22. A U-shaped bracket 24, which straddles the transformer 22, is bolted to the plate 18, to continue the central support column to an upper point on bracket 24, above the transformer 22, where a ring bolt 26 is secured to threads in the bracket 24. Bolt 26 fastens a circular, dome shaped cover plate 28 over the transformer assembly. The cover plate 28 has a lower lip 30 which contacts the plate 18 to provide an enclosure for the transformer 22. A hole through the plate 18 has a cable clamp 32 anchoring an electrical power cord 34 which leads to primary terminals 36 of transformer 22. Optionally, holes 38 may be provided in the plate 18 for purposes of ventilation to the space occupied by the transformer 22.

The transformer 22 is bolted to the plate 18 with first and second bolts 40 and 42 which also secure respective first and second ultraviolet lamp sockets 44 and 46. First and second cylindrical ultraviolet lamps 48 and 50 are inserted in respective sockets 44 and 46 and extend to a second set of respective sockets 52 and 54. Sockets 52 and 54 are edge mounted to a bracket 56 which is secured by nuts 58 to the lower threaded portion 16 of the conduit 12. Although not shown, it is to be understood that sockets 44 and 46 may be attached to a bracket secured between nuts 20 in the manner of sockets 52 and 54.

Also secured between the nuts 58 is a bracket 60 which positions a lower collar 62 coaxially to conduit 12 by being peripherally riveted thereto. Collar 62 forms a lower shape-retaining form for an outer cylindrical screen 64 having openings of a size sufficient to permit penetration of insects. Screen 64 is typically formed from a rectangular sheet bent into a cylindrical shape and welded at opposing edges. An upper collar 66 provides shape retention at the upper end of the screen 64, and has an inwardly extending lip portion 68 which is secured by captive bolts 70 to plate 18 for simple detachment. To facilitate detachment, only the upper members of bolts 70 are removable.

An inner concentric cylindrical screen 72 is supported from screen 64 by a plurality of insulators 74 which are preferably teflon surfaced to inhibit a build up of electrocuted insects thereon and to facilitate their removal by simply tapping on the device. The inner cylindrical screen 72 is spaced from the outer cylindrical screen 64 by a distance determined in conjunction with the high voltage output of the transformer 22 so as to prevent spark discharge between the screens 64 and 72 until an insect enters the space therebetween at which time electrocution takes place. The inner screen 72 is axially shorter than the outer screen 64 with the approximate axial length just less than the distance between the collars 62 and 66 so as to minimize the possibility of an insect entering at the axial borders of the screen 64 without being brought into the field between the screens 64 and 72. A high voltage output 76 of the transformer 22 is connected through a lead 78 to the inner screen 72 to provide an elevated electrical potential, typically 5,000 volts, to the inner screen. The low side of the secondary of transformer 22 is connected, preferably through the transformer housing, to all other metal parts of the device, including the outer screen 64.

As can be seen, the inner screen 72 has indentations 80 where the insulators 74 are attached. The indentations 80 permit the insulators 74 to be substantially longer, in this case approximately twice, than the distance between the inner and outer screens 64 and 72. This extended length insulator reduces the possibility that electrocuted insects will accumulate on the insulators 74 to an extent which provides a resistance bridge between the inner and outer screens 64 and 72 and which reduces or eliminates the effectiveness of the high potential field between the two screens. The details of this construction can be more clearly seen in FIG. 2 showing the insulators 74 in sectional view and secured by bolts 84 to the outer and inner screens 64 and 72. The indented portion 80 is indicated in FIG. 2 and is preferably formed by a stamping operation during device fabrication. Also indicated in FIG. 2 are welds 86 and 88 securing opposing edges of the outer and inner screens 64 and 72 respectively. The welds 86 and 88 are preferable to soldered or plastic tie joints which could be melted or burned in the event that a large insect became trapped between the screens at a point of juncture and thus provide a resistance path sufficient to generate a high heat.

Returning to FIG. 1, excitation for the ultraviolet lamps 48 and 50 is provided from the primary connector 36 to leads 90 which are lead through the conduit 12 for exiting at its bottom and for connection to the sockets 52 and 54. Additional conductors 92 and 94 are applied to starting modules 98 and 100 respectively which are secured adjacent to the sockets 44 and 46 to facilitate ignition of ultraviolet lamps 48 and 50 as is known in the art.

In FIG. 3 an exploded view is shown of a unit having an alternative decorator design while still possessing the structural advantages of the present invention. As indicated in FIG. 3 a central support conduit 112 is threaded at upper and lower ends 114 and 116 with the threaded portion 116 provided by an extension bracket 117 which permits exiting of electrical leads from the conduit 112 without passing through the end 116. Although conduit 12 in FIG. 1 is shown without a portion similar to bracket 117 a similar termination may be used there. Returning to FIG. 2, a squared upper plate 118 is provided for mounting of transformer 120 through spacers 121 and is centrally secured to the upper threaded portion 114 of the shaft 112. The plate 118 has a U-shaped bracket 122 secured thereto in straddling relationship to transformer 120. An upper, centrally threaded hole 124 is adapted to receive a ring bolt 126 which secures a squared, upper dome shaped cover 128. The lower threaded portion 116 of the central support conduit 112 is attached to a bracket 130 by a nut 132.

First and second sets of ultraviolet lamp sockets 134 and 136; and 138 and 140 are respectively secured to the squared top plate 118 and the bottom bracket 130. Respective ultraviolet lamps 142 and 144 are inserted into sockets 134 and 138; and 136 and 140 respectively. Starting modules 146 and 148 are associated with respective sockets 134 and 136 and attached adjacent thereto below the square top plate 118.

The inner and outer screens for the design of FIG. 3 are supported by a slightly tapered, square frame 150. The frame 150 provides a larger hole opening 152 at its top and smaller opening 154 at its bottom. Four equal trapezoidal side openings 156 are adapted to receive four similarly shaped electrically conducting screens 158 by weld or bolt attachment. Screens 158 are electrically grounded to the frame 150 if of metal construction or through separate leads if frame 150 is of plastic construction. Four inner trapezoidal screens 160, slightly smaller in dimension than screens 158, are supported inwardly from the outer screens 158 by three or more, preferably teflon coated, insulators 162. The inner screens 160 are stamped with indented portions 164 where the insulated spacers 162 are attached to inhibit, as indicated, above, a build up of insects that could provide a conductive bridge between the inner and outer screens.

The frame 150 has an upper flange portion 166 bordering the opening 152 and flange 166 is adapted to provide bolt attachment to the upper top plates 118 to facilitate simple replacement of the entire screen assembly contained by the frame 150. The bottom portion bordering the opening 154 is centered about the central support conduit 112 by lower bracket 130 which is peripherally attached by bolt or rivet to the frame 150 at points bordering the hole 154.

Electrical excitation for the transformer 120 and for the ultraviolet lamps 142 and 144 is not indicated in FIG. 3 but is to be understood to be provided in the same manner as in FIG. 1. The high voltage secondary output 170 from the transformer 120 is also to be connected to the four inner screens 164.

The insect control system indicated and described above is constructed to provide a strong and rigid structural unit which is capable of withstanding a buffeting from wind and wind born objects and thus capable of permanent outdoor installation as is desirable to provide a cumulative insect control effect from its continuous use. Rigid, collar or frame, screen supports greatly reduce the potential for deforming of the inner and outer screens from environmental effects. When replacement is required, however, for example due to possible bending of the electrified screens, the entire screen assembly is designed for rapid replacement as a unit. Additionally, the design of the insulated spacers between the two electrified screens provides for an elongated insulated support which reduces the possibility of insect accumulations that would reduce the effectiveness of the potential between the screens by providing a conductive bridge between them. By providing a low friction surface to the insulated spacers the accumulation of bugs is further retarded and what accumulation does occur is easily dislodged by tapping on the device.

Having above described a preferred embodiment of the present invention it will occur to those skilled in the art that various modifications and alterations can be achieved without departing from the spirit of the disclosed invention. Accordingly it is intended to limit the scope of the invention only as indicated in the following claims.

What is claimed is:

1. An electrical discharge insect control system comprising:
   a central support column;
   first and second supports secured to upper and lower portions of said column;
   an insect lure secured between said first and second supports;
   a voltage augmenting transformer secured to the upper surface of said first support and having electrical input connections thereto from a source of electrical current;
   a securing means;
   a bracket attached to the upper surface of said first support and providing an extension of said support column from said first support to a central point above said transformer and being adapted at said central point above said transformer to receive said securing means;
   a cover plate adapted to be secured between said securing means and said bracket;
   a generally cylindrical first wire screen having first and second collars attached to respective ends thereof to shield the terminations of said first wire screen at said ends and to provide shape retention;
   means for detachably securing said first collar to said first support;
   means for detachably securing said second collar to said support column through said second support;
   a plurality of insulated spacers;
   a generally cylindrical second wire screen smaller in length and diameter than said first wire screen and supported coaxially thereof by said plurality of insulated spacers;
   said insulated spacers being substantially longer than the spacing between said first and second wire screens;
   indentations in one of more of said wire screens to accommodate the greater length of said spacers;
   electrical connections between said second inner wire screen and a high voltage output of said transformer and between a high voltage common output of said transformer and said outer screen;
   said first and second wire screens, first and second collars, and said insulating spacers being readily replaceable as a unit through said detachable securing means.

2. The electrical discharge insect control system of claim 1 wherein said plurality of spacers have a low friction outer surface whereby insects falling thereon are more easily dislodged or prevented from accumulating thereon.

3. The electrical discharge insect control system of claim 1 wherein:
   said first support is a generally circular plate extending to close proximity with said cover;
   said bracket is a generally U-shaped support secured at two points to said plate and at an upper central point to said securing means; and
   said securing means is a ring bolt.

4. The electrical discharge insect control system of claim 1 wherein said first and second wire screens are formed from rectangular sections of wire screen curved in a cylindrical shape and welded at confronting edges to prevent heat generated from conduction of electricity through insects from one of said wire screens to the other from melting the joint between said confronting edges.

5. An electrical discharge insect control system comprising:
   a central support column;
   first and second supports secured to upper and lower portions of said column;
   an insect lure secured between said first and second supports;
   a voltage augmenting transformer secured to the upper surface of said first support and having electrical input connections thereto from a source of electrical current;
   a securing means;
   a bracket attached to the upper surface of said first support and providing an extension of said support column from said first support to a central point above said transformer and being adapted at said central point above said transformer to receive said securing means;
   a cover plate adapted to be secured between said securing means and said bracket;
   a frame structure having top and bottom openings and a plurality of side openings;
   means for detachably securing said frame to said first support at points bordering said top opening;
   means for detachably securing said frame to said support column through said second support;
   a first plurality of wire screens secured across said plurality of side openings;
   a plurality of dielectric spacers;
   a second plurality of wire screens inwardly secured from said first plurality of screens by said plurality of dielectric spacers;
   said dielectric spacers being substantially longer than the spacing between said first and second plurality of wire screens;
   indentations in one or more of said wire screens to accommodate the greater length of said spacers;
   electrical connections between said second plurality of wire screens and a high voltage output of said transformer and between a high voltage common output of said transformer and said first plurality of screens;
   said first and second pluralities of screens, said frame, and said dielectric spacers being readily replaceable as a unit through said detachable securing means.

6. The electrical discharge insect control system of claim 5 wherein said plurality of spacers have a low friction outer surface whereby insects falling thereon are more easily dislodged or prevented from accumulating thereon.

7. The electrical discharge insect control system of claim 5 wherein:
said first support is a generally rectangular plate extending to close proximity with said cover;
said bracket is a generally U-shaped support secured at two points to said plate and at an upper central point to said securing means; and
said securing means is a ring bolt.

8. In an electrical discharge insect control system of the type having first and second conductive screens electrified to provide a potential difference therebetween which is operative to electrocute insects therebetween, the improvement comprising:
a plurality of indentations in one or more of said first and second screens;
a plurality of extended length dielectric spacers joining said first and second screens at the points of said indentations to provide relative positioning and support of said screens, one to the other, and extending beyond the surfaces of said one or more screens into said indentations to provide portions of said dielectric spacers which are shielded from acquiring an accumulation of electrocuted insects whereby a conductive shunt between said first and second screens is inhibited from developing.

9. The improved electrical discharge insect control system of claim 8 wherein said spacers have a low adhesion surface to inhibit an accumulation of insects thereon.

10. The improved electrical discharge insect control system of claim 8 further including:
a support structure for said insect control system;
a frame for containing said first and second screens in a predetermined form; and
means for detachably securing said frame to said structure to permit simple replacement of said first and second screens, said spacers, and said frame as a unit.

11. The improved electrical discharge insect control system of claim 10 wherein:
said structure includes a central support column;
said frame contains said first and second screens in enclosing relationship to said central support column; and
said means for detachably securing said frame and structure include means for securing said frame to top and bottom portions of said central support column.

12. An electrical discharge insect control system comprising:
a high voltage transformer operative to provide a high voltage output;
first and second, outer and inner conductive screens connected to opposite potentials of said high voltage output;
said first, outer screen generally surrounding said second, inner screen in close spaced relationship thereto;
a plurality of dielectric spacers for maintaining the close spaced relationship of said first and second screens relative to each other;
an energy radiating cylindrical insect lure;
a support plate for holding said transformer and said lure on opposite sides thereof, said lure extending perpendicular to said plate;
a frame secured to said first screen for defining and maintaining a predetermined shape for said first screen, said frame including a support bar across a bottom opening of said first screen and an upper collar on said first screen; and
first and second means for detachably securing said frame to said plate respectively at a point on said bar and at points on said collar.

* * * * *